United States Patent
Shigeta

(10) Patent No.: US 11,374,397 B2
(45) Date of Patent: Jun. 28, 2022

(54) POWER SUPPLY DEVICE AND ABNORMALITY DETECTION METHOD FOR AC POWER SUPPLY

(71) Applicant: TOSHIBA MITSUBISHI-ELECTRIC INDUSTRIAL SYSTEMS CORPORATION, Chuo-ku (JP)

(72) Inventor: Hiroki Shigeta, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/282,885

(22) PCT Filed: Jun. 17, 2019

(86) PCT No.: PCT/JP2019/023854
§ 371 (c)(1),
(2) Date: Apr. 5, 2021

(87) PCT Pub. No.: WO2020/255189
PCT Pub. Date: Dec. 24, 2020

(65) Prior Publication Data
US 2021/0351583 A1 Nov. 11, 2021

(51) Int. Cl.
*H02H 7/20* (2006.01)
*H02H 1/00* (2006.01)

(52) U.S. Cl.
CPC ............ *H02H 7/20* (2013.01); *H02H 1/0007* (2013.01)

(58) Field of Classification Search
CPC ........ H02H 7/20; H02H 1/0007; H02H 3/207; H02J 9/06; G01R 19/16566; G01R 19/18; G01R 19/30; H02M 7/48
See application file for complete search history.

(56) References Cited

U.S. PATENT DOCUMENTS

2018/0217187 A1* 8/2018 Urakawa ................. H02H 7/20
2018/0278088 A1* 9/2018 Toyoda ..................... H02J 3/18
(Continued)

FOREIGN PATENT DOCUMENTS

| JP | 5-137277 A | 6/1993 |
| JP | 2006-242739 A | 9/2006 |

(Continued)

OTHER PUBLICATIONS

International Search Report dated Aug. 27, 2019 in PCT/JP2019/023854 filed Jun. 17, 2019.

(Continued)

*Primary Examiner* — Jared Fureman
*Assistant Examiner* — Nicolas Bellido
(74) *Attorney, Agent, or Firm* — Oblon, McClelland, Maier & Neustadt, L.L.P.

(57) ABSTRACT

A switch is connected between an AC power supply and a load. A controller detects an abnormality of the AC power supply by detecting an instantaneous value of a three-phase AC voltage supplied from the AC power supply, when the switch is on. Based on an instantaneous value of the three-phase AC voltage detected at a first time and a first threshold value preset for a peak value of the three-phase AC voltage, the controller estimates a second threshold value for an instantaneous value of the three-phase AC voltage at a second time having a prescribed time difference from the first time. The controller detects the abnormality of the AC power supply by comparing the estimated second threshold value with the instantaneous value of the three-phase AC voltage detected at the second time. The controller turns off the switch when the abnormality of the AC power supply is detected.

8 Claims, 8 Drawing Sheets

(56) References Cited

U.S. PATENT DOCUMENTS

2018/0375372 A1* 12/2018 Toyoda .................... H02J 9/06
2019/0237966 A1* 8/2019 Porter .............. G01R 19/16547
2020/0295595 A1* 9/2020 Shigeta .................. H02J 9/062

FOREIGN PATENT DOCUMENTS

KR  10-2010-0132316 A   12/2010
WO  WO 2017/022329 A1   2/2017

OTHER PUBLICATIONS

Office Action dated Feb. 8, 2022, in Indian Patent Application No. 202117016221 w/English-language Translation.

* cited by examiner

POWER SUPPLY DEVICE AND ABNORMALITY DETECTION METHOD FOR AC POWER SUPPLY

TECHNICAL FIELD

The present invention relates to a power supply device and an abnormality detection method for an AC power supply.

BACKGROUND ART

Japanese Patent Laying-Open No. 5-137277 (PTL 1) discloses an uninterruptible power supply device including a power failure detection control circuit that detects a voltage drop of an AC input power supply. The power failure detection control circuit detects the voltage drop of the AC input power supply when an effective value of an AC input voltage decreases to be equal to or lower than a power failure detection level (e.g., 85%) that is lower than a rated voltage (100%). In PTL 1, when the voltage drop of the AC input power supply is detected, an inverter device converts DC power of a storage battery into AC power and supplies the AC power to a load.

CITATION LIST

Patent Literature

PTL 1: Japanese Patent Laying-Open No. 5-137277

SUMMARY OF INVENTION

Technical Problem

In the power failure detection control circuit described in PTL 1, when the AC input voltage is subjected to an abrupt voltage fluctuation, a peak value of the AC input voltage decreases after the voltage fluctuation, and the effective value of the AC input voltage also decreases accordingly. Therefore, a time difference occurs between the timing when the fluctuation of the AC input voltage occurs and the timing when the effective value of the AC input voltage decreases to be equal to or lower than the power failure detection level. Thus, it is concerned that the voltage supplied to the load may drop temporarily during a time period in which the DC power of the storage battery is converted into AC power and the AC power is supplied to the load by the inverter device.

The present invention has been made to solve the above-described problem, and an object of the present invention is to provide a power supply device and an abnormality detection method for an AC power supply that allow quick detection of an abnormality of the AC power supply.

Solution to Problem

According to an aspect of the present invention, a power supply device includes: a switch connected between an AC power supply and a load; and a controller that controls on and off of the switch. The controller includes: an abnormality detection unit; and a switch control unit. The abnormality detection unit detects an abnormality of the AC power supply by detecting an instantaneous value of a three-phase AC voltage supplied from the AC power supply, when the switch is on. The switch control unit turns off the switch when the abnormality of the AC power supply is detected. Based on an instantaneous value of the three-phase AC voltage detected at a first time and a first threshold value preset for a peak value of the three-phase AC voltage, the abnormality detection unit estimates a second threshold value for an instantaneous value of the three-phase AC voltage at a second time, the second time having a prescribed time difference from the first time. The abnormality detection unit detects the abnormality of the AC power supply by comparing the estimated second threshold value with the instantaneous value of the three-phase AC voltage detected at the second time.

Advantageous Effects of Invention

According to the present invention, there can be provided a power supply device and an abnormality detection method for an AC power supply that allow quick detection of an abnormality of the AC power supply.

DESCRIPTION OF EMBODIMENTS

Figure 1:
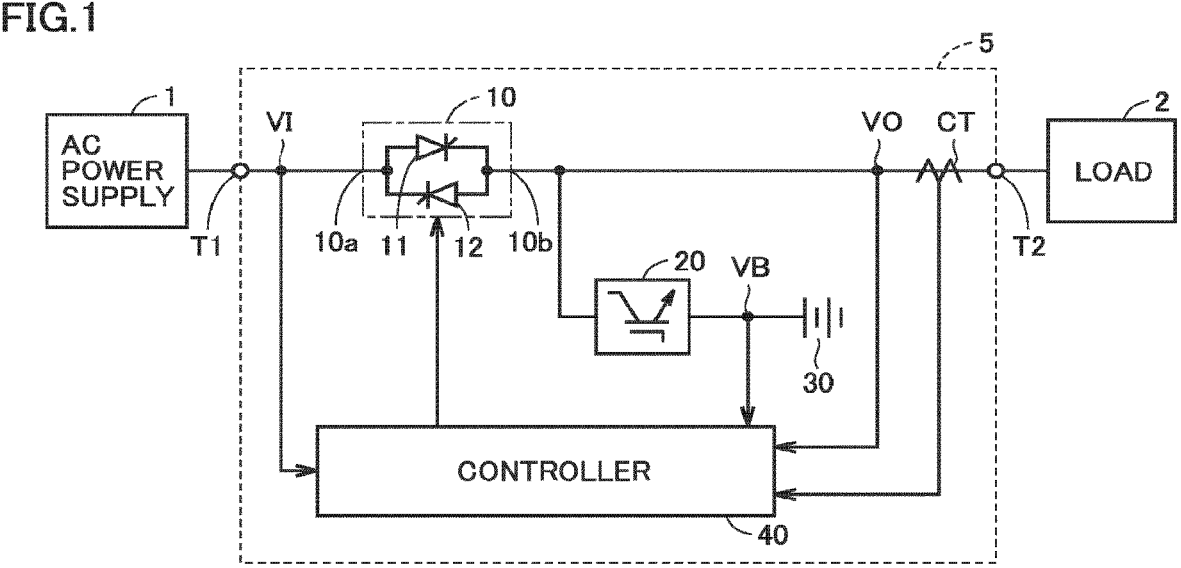
FIG. 1 is a circuit block diagram showing a configuration example of a power supply device according to an embodiment.

An embodiment of the present invention will be described in detail hereinafter with reference to the drawings. In the following description, the same or corresponding portions in the drawings are denoted by the same reference characters and description thereof will not be repeated in principle.

(Configuration of Power Supply Device)

FIG. 1 is a circuit block diagram showing a configuration example of a power supply device according to an embodiment. While the power supply device supplies three-phase AC power to a load, only a portion related to one phase is shown in FIG. 1 for the sake of simplification of the drawing and the description. The power supply device is also called "multi power compensator".

Referring to FIG. 1, a power supply device 5 includes an AC input terminal T1, an AC output terminal T2, a switch 10, a current detector CT, an inverter (bidirectional converter) 20, a battery 30, and a controller 40. AC input terminal T1 receives an AC voltage VI having a commercial frequency from an AC power supply 1. An instantaneous value of AC voltage VI is detected by controller 40. Based on the instantaneous value of AC voltage VI, controller 40 determines whether or not AC voltage VI is normally supplied from AC power supply 1. Using a method described below, controller 40 detects an instantaneous voltage drop and an overvoltage of AC power supply 1 based on the instantaneous value of AC voltage VI. In the specification of the present application, the instantaneous voltage drop of AC power supply 1 includes a power failure of AC power supply 1.

AC output terminal T2 is connected to a load 2. Load 2 is driven by AC power supplied from the power supply device. An instantaneous value of an AC voltage V0 that appears at AC output terminal T2 is detected by controller 40.

One terminal 10a of switch 10 is connected to AC input terminal T1, and the other terminal 10b is connected to AC output terminal T2. Switch 10 is, for example, a thyristor switch including thyristors 11 and 12 connected in antiparallel between one terminal 10a and the other terminal 10b. When AC voltage VI is normally supplied from AC power supply 1 (when AC power supply 1 is normal), switch 10 is on. When AC voltage VI is no longer normally supplied from AC power supply 1 (when an instantaneous voltage drop or an overvoltage of AC power supply 1 occurs), switch 10 is turned off.

Switch 10 is controlled by controller 40. Specifically, thyristors 11 and 12 are turned on (brought into conduction) in response to a gate signal input from controller 40. Then, thyristors 11 and 12 that have been turned on are turned off (cut off) in response to zero-crossing of AC voltage VI in a cut-off state of the gate signal.

Current detector CT detects an instantaneous value of an AC current (load current) IO that flows from the other terminal 10b of switch 10 to AC output terminal T2, and provides a signal indicating the detected value to controller 40.

Inverter 20 is connected between the other terminal 10b of switch 10 and battery 30, and is controlled by controller 40. Inverter 20 is implemented by a semiconductor switching element. An IGBT (Insulated Gate Bipolar Transistor) is, for example, used as the semiconductor switching element. In addition, PWM (Pulse Width Modulation) control can be applied as a method for controlling the semiconductor switching element.

When AC power supply 1 is normal, inverter 20 converts AC power supplied from AC power supply 1 through switch 10 into DC power and stores the DC power in battery 30. At this time, controller 40 controls inverter 20 such that an inter-terminal voltage VB of battery 30 becomes a reference voltage VBr. Instead of battery 30, a capacitor may be connected to inverter 20. Battery 30 corresponds to an example of "power storage device".

When AC power supply 1 is abnormal (when an instantaneous voltage drop or an overvoltage occurs), inverter 20 converts the DC power of battery 30 into AC power having a commercial frequency and supplies the AC power to load 2. At this time, based on AC voltage V0 and AC current IO, controller 40 controls inverter 20 such that AC voltage V0 becomes a reference voltage VOr. When inter-terminal voltage VB of battery 30 drops to reach a lower limit voltage, controller 40 stops the operation of inverter 20.

Controller 40 can be implemented by, for example, a microcomputer or the like. As one example, controller 40 has a not-shown memory and a not-shown CPU (Central Processing Unit) embedded therein, and can execute the control operation including below-described abnormality detection by software processing by the CPU executing a program prestored in the memory. Alternatively, instead of software processing, a part or all of the control operation can also be implemented by hardware processing using an embedded dedicated electronic circuit or the like.

Next, the operation of the power supply device will be described.

When AC power supply 1 is normal, switch 10 is turned on, the AC power is supplied from AC power supply 1 through switch 10 to load 2, and load 2 is operated. The AC power is also supplied from AC power supply 1 through switch 10 to inverter 20, and the AC power is converted into DC power, which is stored in battery 30.

In contrast, when AC power supply 1 is abnormal (when an instantaneous voltage drop or an overvoltage occurs), switch 10 is instantaneously turned off, and the DC power of battery 30 is converted into AC power, which is supplied to load 2 by inverter 20. Therefore, even when an abnormality of AC power supply 1 occurs, the operation of load 2 can be continued during a time period in which the DC power is stored in battery 30.

(Abnormality Detection Method for AC Power Supply)

Next, a method for detecting an abnormality of AC power supply 1 will be described. First, an abnormality detection method according to a comparative example and a problem thereof will be described with reference to FIG. 2. As one aspect of the abnormality detection method according to the comparative example, a method for detecting an overvoltage of AC power supply 1 will be described.

(Abnormality Detection Method According to Comparative Example)

Figure 2:
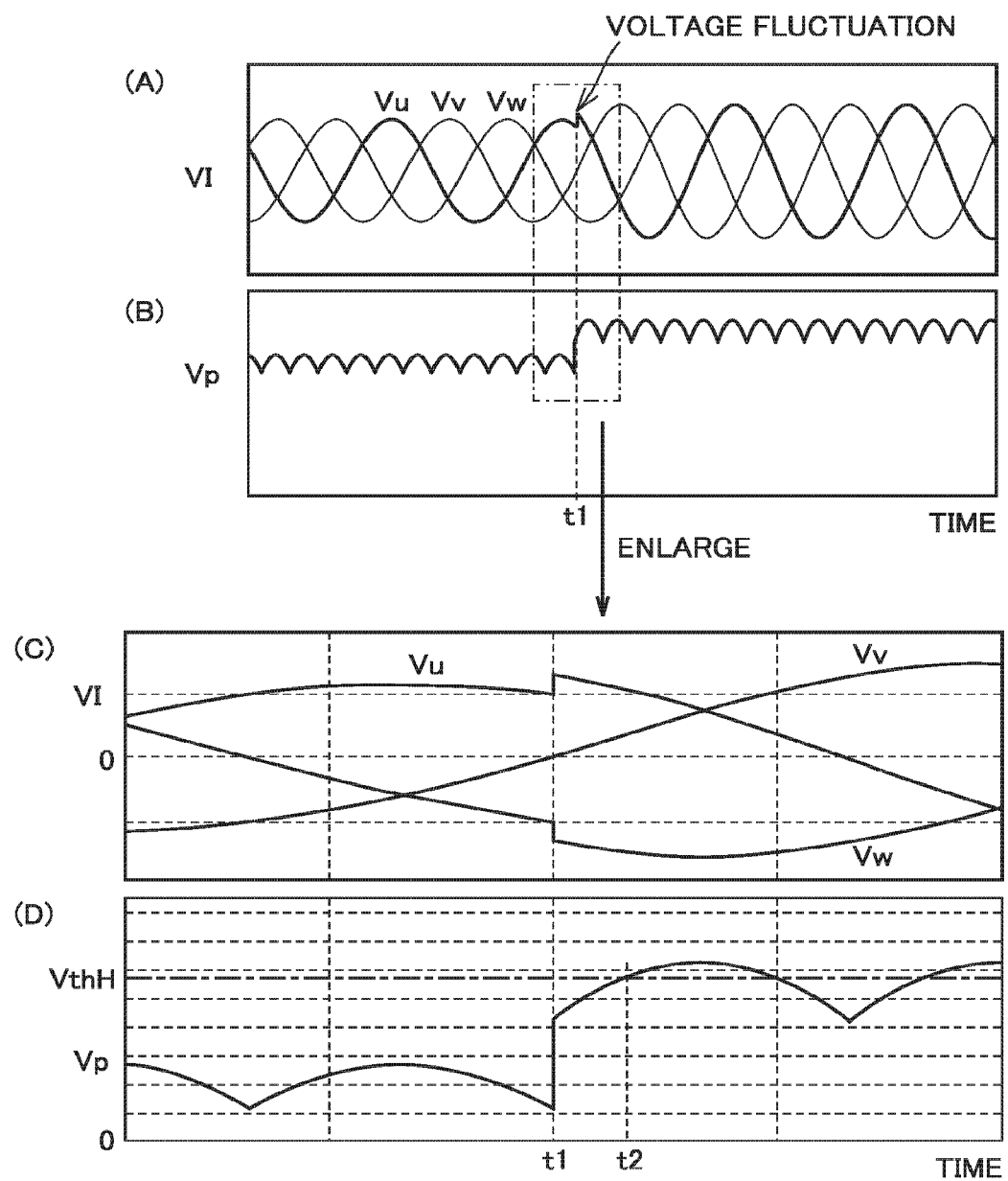
FIG. 2 is a diagram for illustrating an abnormality detection method according to a comparative example.

FIG. 2 is a diagram for illustrating the abnormality detection method according to the comparative example. FIG. 2(A) shows waveforms of AC voltage VI (U-phase voltage Vu, V-phase voltage Vv, W-phase voltage Vw) supplied from AC power supply 1. FIG. 2(B) shows a waveform of a value Vp obtained by full-wave rectification of AC voltage VI shown in FIG. 2(A).

As shown in FIG. 2(A), the waveforms of U-phase voltage Vu, V-phase voltage Vv and W-phase voltage Vw are displaced by 120° with respect to each other. Full-wave rectification value Vp shown in FIG. 2(B) is determined by the magnitude of a peak value of each phase voltage.

Now, let us assume that an overvoltage occurs in AC power supply 1 at time t1. In FIG. 2(A), U-phase voltage Vu and V-phase voltage Vv fluctuate abruptly at time t1. After time t1, the peak value of each phase voltage increases, and thus, full-wave rectification value Vp also increases.

FIG. 2(C) is an enlarged view of the waveforms of AC voltage VI at and near time t1. FIG. 2(D) is an enlarged view of the waveform of the full-wave rectification value at and near time t1. The abnormality detection method according to the comparative example is configured to detect an overvoltage of AC power supply 1 based on full-wave rectification value Vp of AC voltage VI.

Specifically, as shown in FIG. 2(D), a threshold value VthH for detecting an overvoltage is preset for full-wave rectification value Vp. When full-wave rectification value Vp of AC voltage VI exceeds threshold value VthH, it is determined that an overvoltage occurs in AC power supply 1. In the example in FIG. 2(D), at time t2 later than time t1, full-wave rectification value Vp exceeds threshold value VthH, and thus, an overvoltage is detected.

As described above, in the abnormality detection method according to the comparative example, there is a time difference between the timing (time t1) when AC voltage VI fluctuates abruptly and the timing (time t2) when full-wave rectification value Vp of AC voltage VI exceeds threshold value VthH. The time difference may be a length corresponding to, at most, a ⅙ cycle of AC voltage VI. The ⅙ cycle of AC voltage VI corresponds to a time period required for full-wave rectification value Vp to change from a minimum value to a maximum value.

If threshold value VthH for detection of an overvoltage is set at a lower value, the timing when full-wave rectification value Vp exceeds threshold value VthH is made earlier, and thus, the time difference can be shortened. However, it is concerned that when threshold value VthH is decreased, an instantaneous voltage rise caused by noise is erroneously determined as an overvoltage.

In FIG. 2(D), when an overvoltage is detected at time t2, the gate signal input to thyristors 11 and 12 of switch 10 is cut off. When the gate signal is cut off, thyristors 11 and 12 are turned off at the timing of zero-crossing of AC voltage VI. That is, switch 10 is turned off later than the timing when the gate signal is cut off. Thus, depending on a phase of AC voltage VI at the timing when the gate signal is cut off, a time difference between the timing (time t1) when AC voltage VI fluctuates abruptly and the timing when switch 10 is actually turned off may be increased in some cases. In this case, it is concerned that an overvoltage is applied to load 2 until switch 10 is turned off.

Therefore, in order to prevent an overvoltage from being applied to load 2, it is necessary to shorten the time difference between the timing (time t1) when AC voltage VI fluctuates abruptly and the timing when switch 10 is turned off.

The present embodiment proposes an abnormality detection method that can make the timing of detection of an overvoltage earlier, as compared with the abnormality detection method according to the comparative example. According to the present embodiment, a time difference between the timing when AC voltage VI fluctuates abruptly and the timing when an overvoltage is detected can be shortened. As a result, the time difference between the timing when AC voltage VI fluctuates abruptly and the timing when switch 10 is turned off can be shortened. Therefore, the possibility of application of an overvoltage to load 2 can be reduced.

(Overvoltage Detection Method According to the Present Embodiment)

Figure 3:
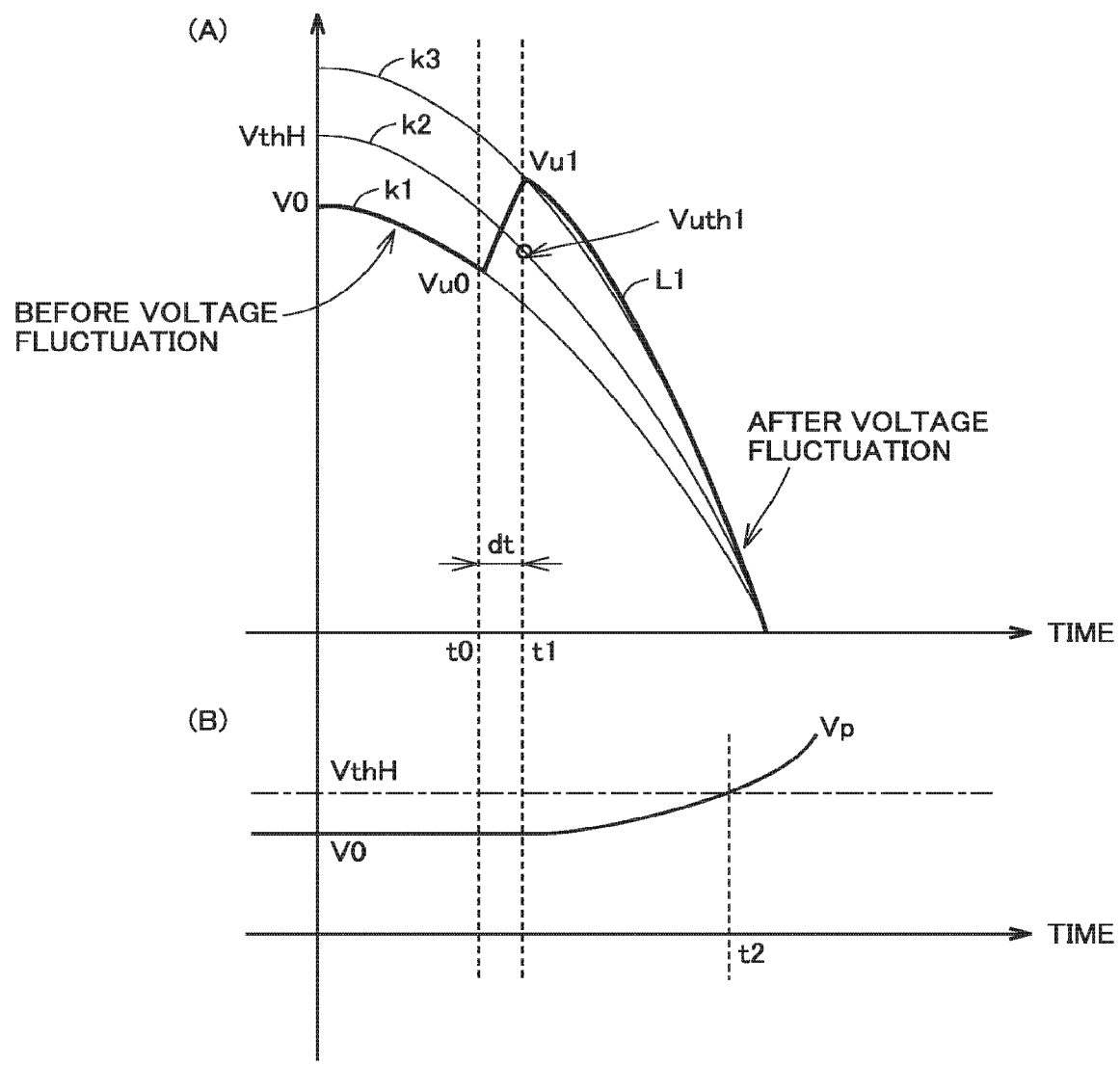
FIG. 3 is a diagram for illustrating an abnormality detection method according to the present embodiment.

FIG. 3 is a diagram for illustrating the abnormality detection method according to the present embodiment. As one aspect of the abnormality detection method according to the present embodiment, a method for detecting an overvoltage of AC power supply 1 will be described with reference to FIG. 3.

FIG. 3(A) shows a waveform of U-phase voltage Vu, of AC voltage VI detected by controller 40. Although not shown, a waveform of each of V-phase voltage Vv and W-phase voltage Vw is displaced by 120° with respect to the waveform of U-phase voltage Vu.

U-phase voltage Vu is shown by a thick solid line L1 in FIG. 3(A). In the example in FIG. 3(A), U-phase voltage Vu fluctuates abruptly near time t0. Vu0 represents U-phase voltage Vu at time t0 immediately before the fluctuation, and Vu1 represents U-phase voltage Vu at time t1 immediately after the fluctuation. Time t1 has a time difference dt from time t0 (t1=t0+dt).

FIG. 3(A) further shows three types of waveforms k1 to k3 that are different in peak value from each other. Waveform k1 represents a waveform of U-phase voltage Vu when AC power supply 1 is normal. Waveform k2 represents a waveform of U-phase voltage Vu when the peak value is equal to threshold value VthH. Waveform k3 represents a waveform of U-phase voltage Vu when AC power supply 1 is abnormal (i.e., after the voltage fluctuation occurs). U-phase voltage Vu shown by thick solid line L1 changes along waveform k1 before time t0 (before the voltage fluctuation occurs), whereas U-phase voltage Vu changes along waveform k3 after time t1 (after the voltage fluctuation occurs).

FIG. 3(B) shows a waveform of peak value Vp of AC voltage VI. Peak value Vp can be calculated, for example, by performing full-wave rectification of AC voltage VI. Alternatively, peak value Vp can be calculated by performing moving average of AC voltage VI.

As shown in FIG. 3(B), peak value Vp shows a value V0 smaller than threshold value VthH (V0<VthH) at time t0 immediately before the voltage fluctuation (i.e., when AC power supply 1 is normal). After time t1 immediately after the voltage fluctuation, peak value Vp increases gradually, and at time t2 later than time t1, peak value Vp exceeds threshold value VthH. In the abnormality detection method according to the comparative example shown in FIG. 2, an overvoltage is detected at time t2 when peak value Vp exceeds threshold value VthH.

Conceptually, the abnormality detection method according to the present embodiment is configured to, assuming that the voltage fluctuation occurs immediately after time t0, estimate a threshold value Vuth1 for an instantaneous value of U-phase voltage Vu at time t1 immediately after the voltage fluctuation. Threshold value Vuth1 is located on waveform k2 of U-phase voltage Vu when peak value Vp is equal to threshold value VthH. That is, when the instantaneous value of U-phase voltage Vu changes temporally on waveform k1, threshold value Vuth1 for the instantaneous value of U-phase voltage Vu also changes temporally on waveform k2.

The abnormality detection method according to the present embodiment is configured to detect an overvoltage when instantaneous value Vu1 of U-phase voltage Vu at time t1 is larger than threshold value Vuth1 in the above-described configuration. In the example in FIG. 3(A), instantaneous value Vu1 of U-phase voltage Vu at time t1 is larger than threshold value Vuth1 (Vu1>Vuth1). Therefore, an overvoltage is detected at time t1. Thus, an overvoltage can be detected earlier than the timing (time t2) when peak value Vp of AC voltage VI exceeds threshold value VthH.

Although not shown, threshold values for instantaneous values of V-phase voltage Vv and W-phase voltage Vw at time t1 can also be estimated using the above-described method. When at least one of the instantaneous values of U-phase voltage Vu, V-phase voltage Vv and W-phase voltage Vw at time t1 is larger than the threshold value, an overvoltage can be detected.

(Method for Estimating Threshold Value Vuth1)

Next, a method for estimating threshold value Vuth1 for detection of an overvoltage will be described in detail.

As described above, threshold value Vuth1 is a point corresponding to time t1 on waveform k2 of U-phase voltage Vu when peak value Vp is equal to threshold value VthH. Threshold value Vuth1 can be estimated using a phase $\omega t0$ of U-phase voltage Vu at time t0 and threshold value VthH of peak value Vp. $\omega$ represents an angular speed.

Specifically, phase $\omega t0$ of U-phase voltage Vu at time t0 can be calculated in accordance with the following method, using an instantaneous value of V-phase voltage Vv and an instantaneous value of W-phase voltage Vw at time t0 and peak value V0 of AC voltage VI at time t0.

AC voltage VI (U-phase voltage Vu, V-phase voltage Vv, W-phase voltage Vw) supplied from AC power supply 1 is given by the following Equations (1) to (3):

$$Vu = V0 \times \sin(\omega t) \quad (1)$$

$$Vv = V0 \times \sin(\omega t + 120°) \quad (2)$$

$$Vw = V0 \times \sin(\omega t + 240°) \quad (3)$$

According to Equations (2) and (3), a relationship between V-phase voltage Vv and W-phase voltage Vw is given by the following Equation (4):

$$Vv - Vw = \sqrt{3} \times V0 \times \cos(\omega t) \quad (4).$$

By transforming Equation (4), a phase ωt of U-phase voltage Vu can be expressed by a function of Vv, Vw and V0 as shown by the following Equation (5):

$$\omega t = \arccos\{(Vv - Vw)/\sqrt{3} \times V0\} \quad (5).$$

According to Equation (5), phase ωt0 of U-phase voltage Vu at time t0 can be calculated based on the instantaneous value of V-phase voltage Vv and the instantaneous value of W-phase voltage Vw at time t0 and peak value V0 at time t0.

Using phase ωt0 at time t0, a phase ω(t0+dt) of U-phase voltage Vu at time t1 (=t0+dt) is calculated. By substituting calculated phase ω(t0+dt) and threshold value VthH of peak value Vp into Equation (1), threshold value Vuth1 for the instantaneous value of U-phase voltage Vu at time t1 can be calculated. That is, threshold value Vuth1 at time t1 is given by the following Equation (6):

$$Vuth1 = VthH \times \sin\{\omega(t0+dt)\} \quad (6).$$

When threshold value Vuth1 given by Equation (6) is compared with instantaneous value Vu1 of U-phase voltage Vu detected at time t1 and instantaneous value Vu1 exceeds threshold value Vuth1, an overvoltage can be detected.

(Method for Setting Time Difference dt)

As described above, the abnormality detection method according to the present embodiment is configured to estimate, at time t0, threshold value Vuth1 for the instantaneous value of U-phase voltage Vu at time t1. In order to detect an abrupt fluctuation of AC voltage VI using this abnormality detection method, it is important how large time difference dt between time t0 immediately before the voltage fluctuation and time t1 immediately after the voltage fluctuation is.

A method for determining time difference dt will be described below with reference to FIG. 4.

Figure 4:
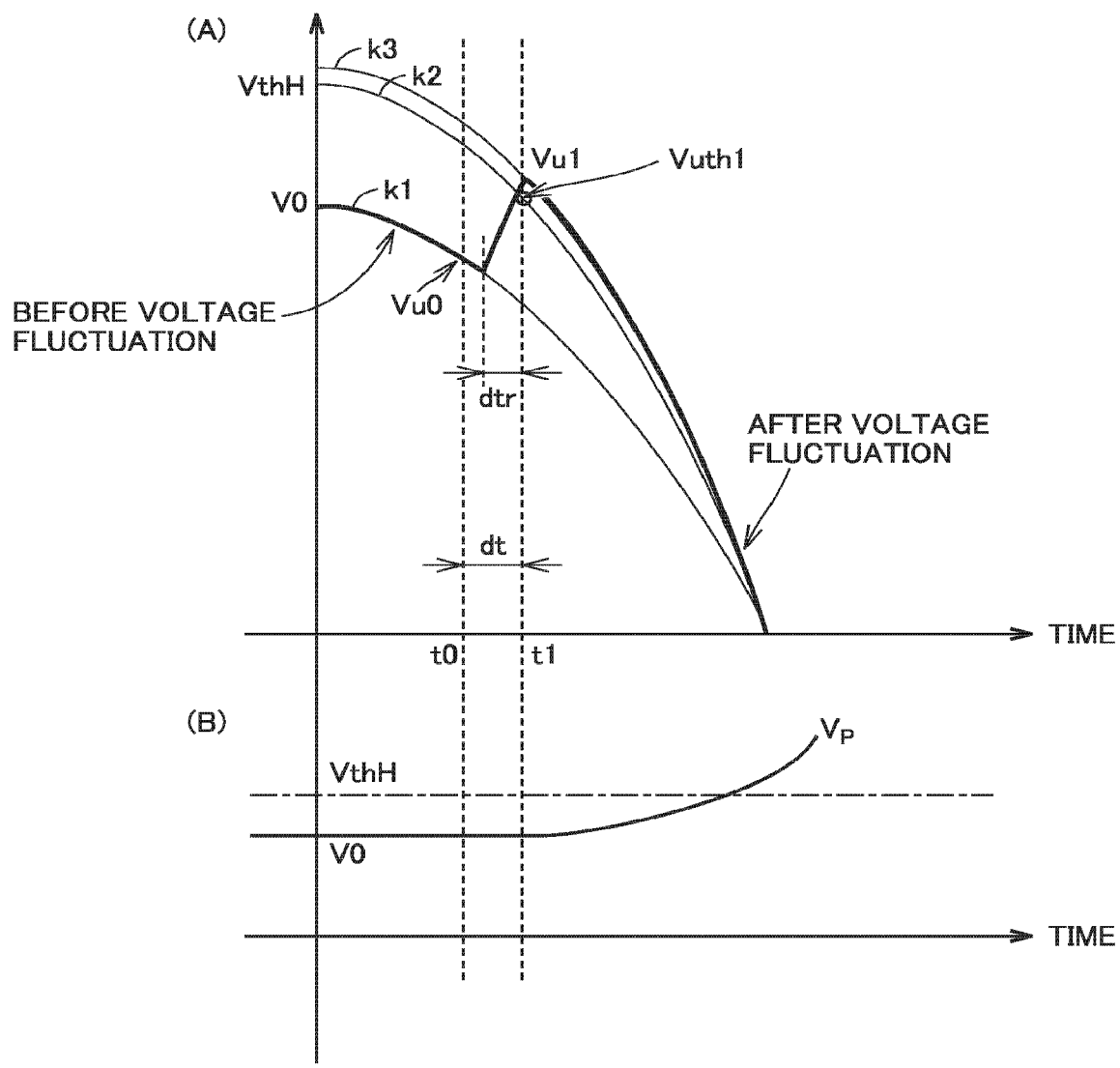
FIG. 4 is a diagram for illustrating a method for setting a time difference dt.

FIG. 4 is similar to FIG. 3 and shows a waveform of U-phase voltage Vu (FIG. 4(A)) and a waveform of peak value Vp of AC voltage VI (FIG. 4(B)).

In order to detect an overvoltage, it is determined whether or not instantaneous value Vu1 of U-phase voltage Vu at time t1 is larger than threshold value Vuth1 at time t1. It is necessary to consider what timing should be used to calculate threshold value Vuth1 using the instantaneous values of V-phase voltage Vv and W-phase voltage Vw and peak value Vp, i.e., what timing should be set as time t0 immediately before the voltage fluctuation.

Specifically, in order to accurately determine whether or not instantaneous value Vu1 is larger than threshold value Vuth1 at time t1, it is necessary to set time difference dt between time t0 and time t1 to be longer than a time period (corresponding to dtr in the figure) required for instantaneous value Vu1 of U-phase voltage Vu to exceed threshold value Vuth1 after the voltage fluctuation actually occurs. This is because when time difference dt is set to be shorter than dtr, phase ωt0 of U-phase voltage Vu is calculated using the instantaneous values of fluctuating V-phase voltage Vv and W-phase voltage Vw and the peak value, because the voltage fluctuation has already started at time t0. In this case, phase ωt0 cannot be calculated accurately, and thus, it is difficult to calculate threshold value Vuth1 with a high degree of precision.

In the abnormality detection method according to the comparative example shown in FIG. 2, an overvoltage is detected based on the time difference corresponding to, at most, the ⅙ cycle of AC voltage VI from the timing when AC voltage VI fluctuates abruptly. The ⅙ cycle of AC voltage VI corresponds to a time period required for the full-wave rectification value of AC voltage VI to change from a minimum value to a maximum value.

The abnormality detection method according to the present embodiment is aimed at detecting an overvoltage earlier than the timing when the full-wave rectification value reaches threshold value VthH after the voltage fluctuation occurs. Therefore, such a case is assumed that time period dtr required for instantaneous value Vu1 to exceed threshold value Vuth1 after the voltage fluctuation actually occurs in U-phase voltage Vu is shorter than the ⅙ cycle of AC voltage VI. In other words, when actual time period dtr is longer than the ⅙ cycle of AC voltage VI, there is no problem in detecting an overvoltage using the abnormality detection method according to the comparative example.

Thus, at most, the ⅙ cycle of AC voltage VI may be assumed as time period dtr in FIG. 4. As a result, time difference dt may only be set to be longer than the ⅙ cycle of AC voltage VI.

(Instantaneous Voltage Drop Detection Method According to the Present Embodiment)

Figure 5:
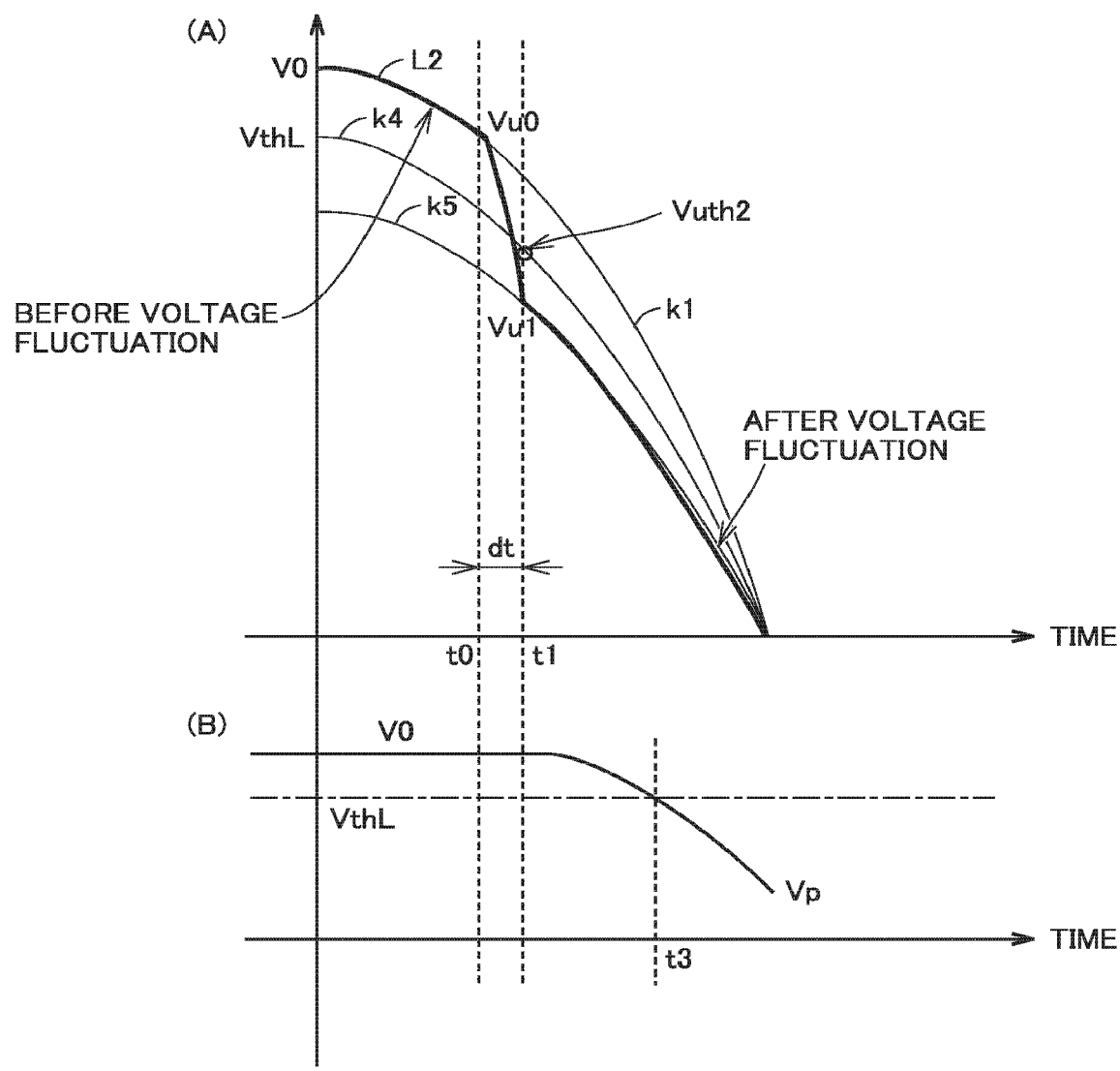
FIG. 5 is a diagram for illustrating the abnormality detection method according to the present embodiment.

FIG. 5 is a diagram for illustrating the abnormality detection method according to the present embodiment. As another aspect of the abnormality detection method according to the present embodiment, a method for detecting an instantaneous voltage drop of AC power supply 1 will be described with reference to FIG. 5.

FIG. 5(A) shows a waveform of U-phase voltage Vu, of AC voltage VI detected by controller 40. Although not shown, a waveform of each of V-phase voltage Vv and W-phase voltage Vw is displaced by 120° with respect to the waveform of U-phase voltage Vu.

U-phase voltage Vu is shown by a thick solid line L2 in FIG. 5(A). In the example in FIG. 5(A), U-phase voltage Vu fluctuates (drops) abruptly near time to. Vu0 represents U-phase voltage Vu at time t0 immediately before the fluctuation, and Vu1 represents U-phase voltage Vu at time t1 immediately after the fluctuation. Time t1 has time difference dt from time t0 (t1=t0+dt).

FIG. 5(A) further shows three types of waveforms k1, k4 and k5 that are different in peak value from each other. Waveform k1 represents a waveform of U-phase voltage Vu when AC power supply 1 is normal. Waveform k4 represents a waveform of U-phase voltage Vu when the peak value is equal to a threshold value VthL for detection of a voltage drop. Waveform k5 represents a waveform of U-phase voltage Vu when AC power supply 1 is abnormal (i.e., after the voltage fluctuation occurs). U-phase voltage Vu shown by thick solid line L2 changes along waveform k1 before time t0 (before the voltage fluctuation occurs), whereas U-phase voltage Vu changes along waveform k5 after time t1 (after the voltage fluctuation occurs).

FIG. 5(B) shows a waveform of peak value Vp of AC voltage VI. Peak value Vp shows a value V0 larger than threshold value VthL (V0>VthL) at time t0 immediately before the voltage fluctuation. After time t1 immediately after the voltage fluctuation, peak value Vp decreases gradually, and at time t3 later than time t1, peak value Vp falls below threshold value VthL. In the abnormality detection method according to the comparative example shown in FIG. 2, an instantaneous voltage drop is detected at time t3 when peak value Vp falls below threshold value VthL.

As described above, the abnormality detection method according to the present embodiment is configured to, assuming that the voltage fluctuation occurs immediately after time t0, estimate a threshold value Vuth2 for the instantaneous value of U-phase voltage Vu at time t1 immediately after the voltage fluctuation. Threshold value Vuth2 is located on waveform k4 of U-phase voltage Vu when peak value Vp is equal to threshold value VthL. That is, when the instantaneous value of U-phase voltage Vu changes temporally on waveform k1, threshold value Vuth2 for the instantaneous value of U-phase voltage Vu changes temporally on waveform k4.

The abnormality detection method according to the present embodiment is configured to detect an instantaneous voltage drop when instantaneous value Vu1 of U-phase voltage Vu at time t1 is smaller than threshold value Vuth2 in the above-described configuration. In the example in FIG. 5(A), instantaneous value Vu1 of U-phase voltage Vu at time t1 is smaller than threshold value Vuth2 (Vu1<Vuth2).

Therefore, an instantaneous voltage drop is detected at time t1. Thus, an instantaneous voltage drop can be detected earlier than the timing (time t3) when peak value Vp of AC voltage VI falls below threshold value VthL.

Although not shown, threshold values for instantaneous values of V-phase voltage Vv and W-phase voltage Vw at time t1 can also be estimated using the above-described method. When at least one of the instantaneous values of U-phase voltage Vu, V-phase voltage Vv and W-phase voltage Vw at time t1 is smaller than the threshold value, an instantaneous voltage drop can be detected.

As described above, the abnormality detection method according to the present embodiment is configured to, assuming that a voltage fluctuation occurs in AC voltage VI at the current timing, estimate threshold value Vuth1, Vuth2 for the instantaneous value of AC voltage VI at the timing immediately after the voltage fluctuation, and detect an abnormality of AC power supply 1 by comparing estimated threshold value Vuth1, Vuth2 with the actual instantaneous value of AC voltage VI at the timing immediately after the voltage fluctuation. Thus, an abnormality of AC power supply 1 can be detected at the earlier timing immediately after the voltage fluctuation, as compared with the abnormality detection method according to the comparative example based on the full-wave rectification value of AC voltage VI.

(Configuration of Controller)

The above-described abnormality detection method according to the present embodiment can be implemented by controller 40 of power supply device 5 operating in accordance with a program stored in a not-shown storage unit. Next, a functional configuration of controller 40 will be described with reference to FIG. 6.

Figure 6:
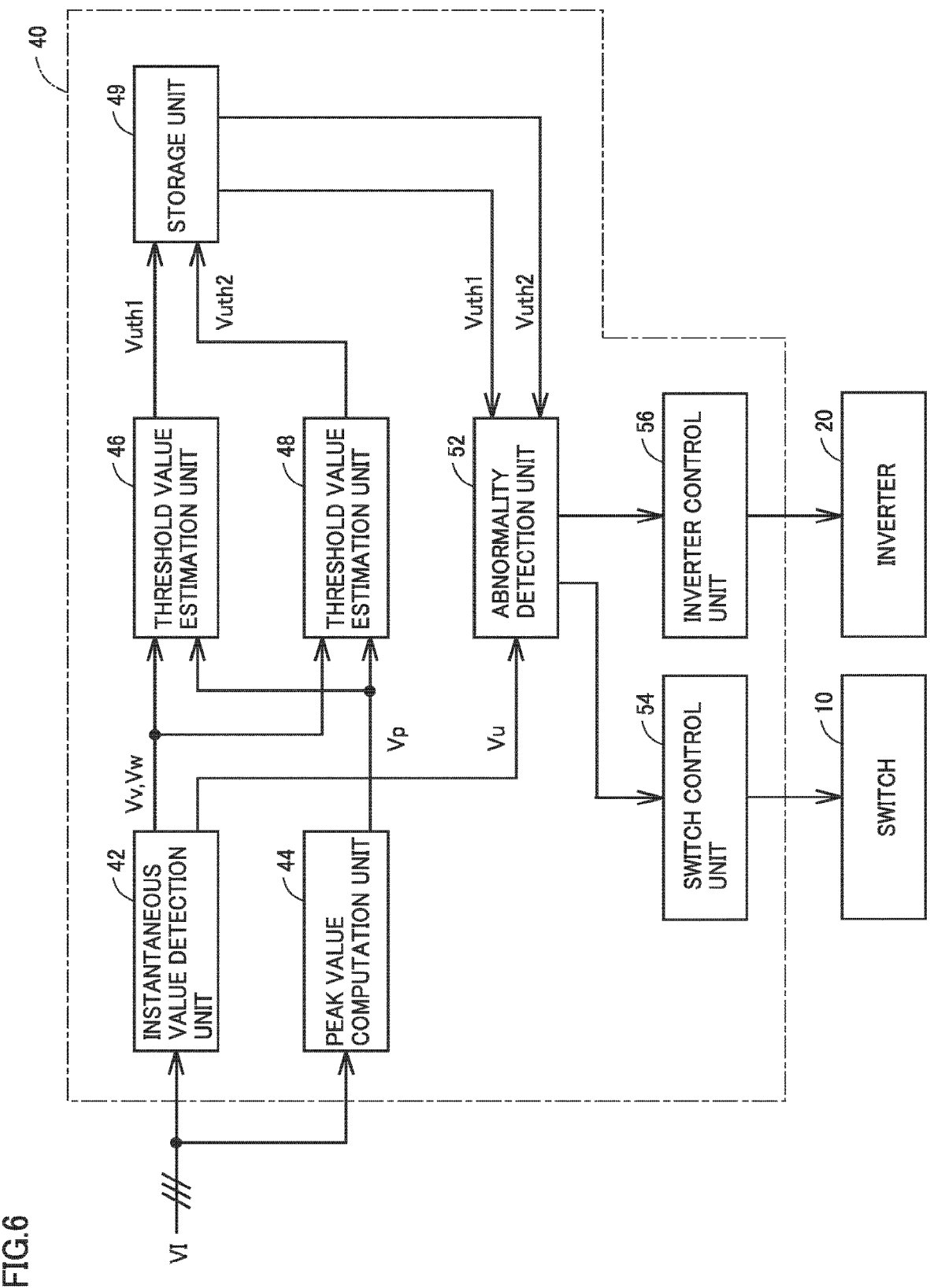
FIG. 6 schematically shows a functional configuration of a controller.

FIG. 6 schematically shows the functional configuration of controller 40.

Referring to FIG. 6, controller 40 includes an instantaneous value detection unit 42, a peak value computation unit 44, threshold value estimation units 46 and 48, a storage unit 49, an abnormality detection unit 52, a switch control unit 54, and an inverter control unit 56.

Instantaneous value detection unit 42 detects the instantaneous value of AC voltage VI (U-phase voltage Vu, V-phase voltage Vw, W-phase voltage Vw) supplied from AC power supply 1. Peak value computation unit 44 computes peak value Vp of AC voltage VI by performing full-wave rectification (or moving average) of AC voltage VI.

Threshold value estimation unit 46 computes threshold value Vuth1 for detection of an overvoltage. Threshold value Vuth1 refers to a threshold value for an instantaneous value of U-phase voltage Vu at time t+dt. Specifically, threshold value estimation unit 46 substitutes the instantaneous value of V-phase voltage Vv and the instantaneous value of W-phase voltage Vw detected by instantaneous value detection unit 42 and peak value Vp computed by peak value computation unit 44 into Equation (5), to thereby compute a phase wt of U-phase voltage Vu at the current timing (defined as time t). Then, threshold value estimation unit 46 substitutes a phase $\omega(t+dt)$ of U-phase voltage Vu at the timing (time t+dt) delayed by time difference dt from the current timing and threshold value VthH for peak value Vp into Equation (6), to thereby compute threshold value Vuth1 for the instantaneous value of AC voltage VI at time t+dt.

Using the similar method, threshold value estimation unit 46 computes threshold values Vvth1 and Vwth1 for detection of an overvoltage. Threshold value Vvth1 refers to a threshold value for an instantaneous value of V-phase voltage Vv at time t+dt. Threshold value Vwth1 refers to a threshold value for an instantaneous value of W-phase voltage Vw at time t+dt.

Threshold value estimation unit 48 computes threshold value Vuth2 for detection of an instantaneous voltage drop. Threshold value Vuth2 refers to a threshold value for an instantaneous value of U-phase voltage Vu at time t+dt. Specifically, threshold value estimation unit 48 substitutes the instantaneous value of V-phase voltage Vv and the instantaneous value of W-phase voltage Vw detected by instantaneous value detection unit 42 and peak value Vp computed by peak value computation unit 44 into Equation (5), to thereby compute phase $\omega t$ of U-phase voltage Vu at the current timing (time t). Then, threshold value estimation unit 48 substitutes phase $\omega(t+dt)$ of U-phase voltage Vu at the timing (time t+dt) delayed by time difference dt from the current timing and threshold value VthL for peak value Vp into Equation (6), to thereby compute threshold value Vuth2 for the instantaneous value of AC voltage VI at time t+dt.

Using the similar method, threshold value estimation unit 48 computes threshold values Vvth2 and Vwth2 for detection of an instantaneous voltage drop. Threshold value Vvth2 refers to a threshold value for an instantaneous value of V-phase voltage Vv at time t+dt. Threshold value Vwth2 refers to a threshold value for an instantaneous value of W-phase voltage Vw at time t+dt.

Threshold value estimation units 46 and 48 store computed threshold values Vuth1 and Vuth2 in storage unit 49. Furthermore, threshold value estimation units 46 and 48 store threshold values Vvth1, Vvth2, Vwth1, and Vwth2 in storage unit 49.

Abnormality detection unit 52 detects an abnormality of AC power supply 1, based on the instantaneous value of U-phase voltage Vu detected by instantaneous value detection unit 42 and threshold values Vuth1 and Vuth2 read from storage unit 49. Specifically, when abnormality detection unit 52 receives the instantaneous value of U-phase voltage Vu at time t+dt from instantaneous value detection unit 42, abnormality detection unit 52 compares the instantaneous value of U-phase voltage Vu with threshold values Vuth1 and Vuth2 at time t+dt. When the instantaneous value of U-phase voltage Vu exceeds threshold value Vuth1, abnormality detection unit 52 detects an overvoltage of AC power supply 1. In contrast, when the instantaneous value of U-phase voltage Vu is smaller than threshold value Vuth2, abnormality detection unit 52 detects an instantaneous voltage drop of AC power supply 1.

Using the similar method, abnormality detection unit 52 detects an abnormality of AC power supply 1, based on the instantaneous value of V-phase voltage Vv detected by instantaneous value detection unit 42 and threshold values Vvth1 and Vvth2 read from storage unit 49. Using the similar method, abnormality detection unit 52 detects an abnormality of AC power supply 1, based on the instantaneous value of W-phase voltage Vw detected by instantaneous value detection unit 42 and threshold values Vwth1 and Vwth2 read from storage unit 49.

Abnormality detection unit 52 outputs a signal indicating the result of detection to switch control unit 54 and inverter control unit 56.

Switch control unit 54 controls on and off of switch 10. Specifically, switch control unit 54 outputs the gate signal to thyristors 11 and 12 that form switch 10. When switch control unit 54 receives a signal indicating detection of an abnormality of AC power supply 1 from abnormality detection unit 52, switch control unit 54 cuts off the gate signal. Thyristors 11 and 12 are turned off in response to zero-crossing of AC voltage VI in a cut-off state of the gate signal.

Inverter control unit 56 controls inverter 20. Specifically, when inverter control unit 56 receives the signal indicating detection of an abnormality of AC power supply 1 from abnormality detection unit 52, inverter control unit 56 starts the operation of inverter 20. Based on AC voltage V0 and AC current IO, inverter control unit 56 controls inverter 20 such that AC voltage VO becomes reference voltage VOr. When inter-terminal voltage VB of battery 30 drops to reach the lower limit voltage, inverter control unit 56 stops the operation of inverter 20.

Figure 7:
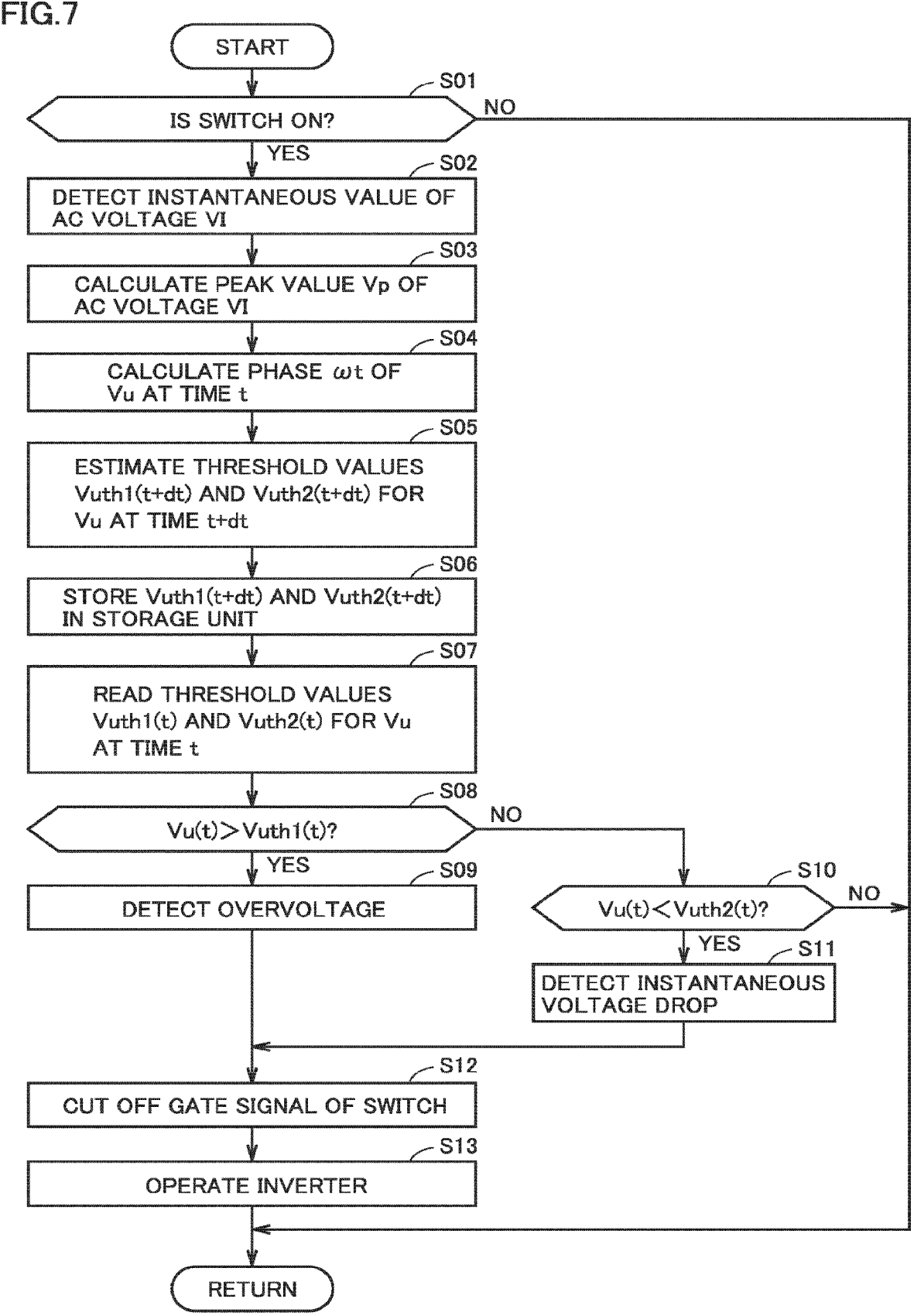
FIG. 7 is a flowchart showing a procedure of a control process executed by the controller.

FIG. 7 is a flowchart showing a procedure of a control process executed by controller 40. The function of controller 40 shown in FIG. 6 is implemented by controller 40 executing the control process shown in FIG. 7 at prescribed cycles. FIG. 7 representatively shows a process of detecting an abnormality of AC power supply 1 by using the instantaneous value of U-phase voltage Vu.

Referring to FIG. 7, in step S01, controller 40 determines whether or not switch 10 is on. When switch 10 is off (NO in S01), the following steps S02 to S11 are skipped.

When switch 10 is on (YES in S01), controller 40 detects an instantaneous value of AC voltage VI (U-phase voltage Vu, V-phase voltage Vv, W-phase voltage Vw) supplied from AC power supply 1 to AC input terminal T1 in step S02.

In step S03, controller 40 calculates peak value Vp of detected AC voltage VI. Controller 40 computes peak value Vp of AC voltage VI by performing full-wave rectification (or moving average) of AC voltage VI.

Then, in step S04, controller 40 calculates phase $\omega t$ of U-phase voltage Vu at the current timing (defined as time t), based on the instantaneous value of AC voltage VI detected in step S02 and peak value Vp calculated in step S03.

In step S05, controller 40 estimates threshold values Vuth1 and Vuth2 for an instantaneous value of U-phase voltage Vu at the timing (time t+dt) delayed by time difference dt from the current timing. In the following description, threshold value Vuth1 at time t+dt is also denoted as Vuth1(t+dt), and threshold value Vuth2 at time t+dt is also denoted as Vuth2(t+dt).

In step S06, controller 40 stores estimated threshold values Vuth1(t+dt) and Vuth2(t+dt) in storage unit 49 (see FIG. 6).

Controller 40 detects an abnormality of AC power supply 1, based on the instantaneous value of AC voltage VI at the current timing (time t).

Specifically, first, in step S07, controller 40 reads threshold values Vuth1 and Vuth2 for the instantaneous value of U-phase voltage Vu at the current timing (time t) from storage unit 49. In the following description, threshold value Vuth1 at time t is also denoted as Vuth1(t), and threshold value Vuth2 at time t is also denoted as Vuth2(t). Threshold values Vuth1 (t) and Vuth2(t) are estimated at the timing (time t−dt) that is earlier than time t by time difference dt, by using an instantaneous value of AC voltage VI at that timing, and are stored in storage unit 49.

In step S08, controller 40 compares an instantaneous value Vu(t) of the U-phase voltage at the current timing (time t) with instantaneous value Vuth1(t) of U-phase voltage Vu at time t. When instantaneous value Vu(t) is larger than threshold value Vuth1 (t) (YES in S08), controller 40 detects an overvoltage of AC power supply 1 in step S09.

In contrast, when instantaneous value Vu(t) is equal to or smaller than threshold value Vuth1(t) (NO in S08), controller 40 compares instantaneous value Vu(t) with threshold value Vuth2(t) in step S10. When instantaneous value Vu(t) is smaller than threshold value Vuth2(t) (YES in S10), controller 40 detects an instantaneous voltage drop of AC power supply 1 in step S11. When instantaneous value Vu(t) is equal to or larger than threshold value Vuth2(t) (NO in S10), controller 40 determines that AC power supply 1 is normal, and ends the process.

When the overvoltage of AC power supply 1 is detected in step S09, or when the instantaneous voltage drop of AC power supply 1 is detected in step S11, the process proceeds to step S12 and controller 40 cuts off the gate signal input to switch 10. As a result, thyristors 11 and 12 that form switch 10 are turned off in response to zero-crossing of AC voltage VI in a cut-off state of the gate signal.

In step S13, controller 40 operates inverter 20. As a result, the DC power of battery 30 is converted into AC power by inverter 20 and the AC power is supplied to load 2. The operation of load 2 can be continued during a time period in which the DC power is stored in battery 30.

As described above, in the abnormality detection method for the AC power supply according to the present embodiment, an abnormality of the AC power supply can be detected at the earlier timing immediately after voltage fluctuation, as compared with the abnormality detection method for the AC power supply based on the peak value of the AC power supply. Thus, an abnormality of the AC power supply is detected quickly, and thus, the switch can be turned off in a short time to switch to power feeding by the inverter. Therefore, fluctuation of the AC voltage supplied to the load can be suppressed.

(Another Configuration Example)

Figure 8:
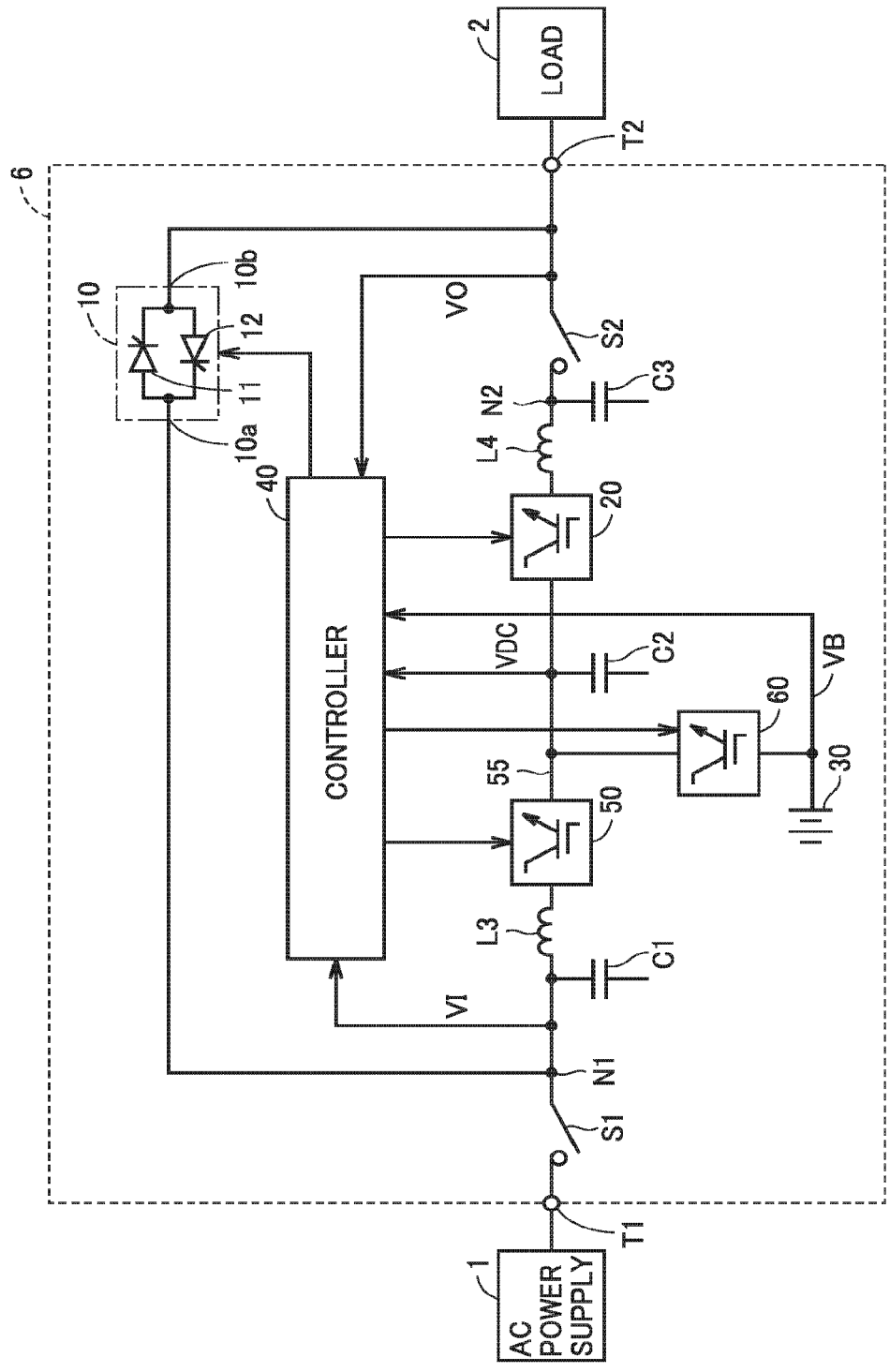
FIG. 8 is a circuit block diagram showing another configuration example of the power supply device according to the embodiment.

The power supply device to which the abnormality detection method for AC power supply 1 according to the present embodiment is applied can include an uninterruptible power supply device 6 shown in FIG. 8, in addition to power supply device 5 shown in FIG. 1.

FIG. 8 is a circuit block diagram showing a configuration of an uninterruptible power supply device according to the embodiment. While uninterruptible power supply device 6 supplies three-phase AC power to the load, only a portion related to one phase is shown in FIG. 8 for the sake of simplification of the drawing and the description.

Referring to FIG. 8, uninterruptible power supply device 6 includes AC input terminal T1 and AC output terminal T2. AC input terminal T1 receives AC voltage VI having a commercial frequency from AC power supply 1. AC output terminal T2 is connected to load 2. An instantaneous value of AC voltage V0 that appears at AC output terminal T2 is detected by controller 40.

Uninterruptible power supply device 6 further includes switches S1 and S2, reactors L3 and L4, capacitors C1 to C3, a converter 50, a bidirectional chopper 60, inverter 20, switch 10, and controller 40.

Switch S1 and reactor L3 are connected in series between AC input terminal T1 and an input node of converter 50. Capacitor C1 is connected to a node N1 between switch S1 and reactor L3. Switch S1 is turned on at the time of use of uninterruptible power supply device 6, and is turned off at the time of, for example, maintenance of uninterruptible power supply device 6.

An instantaneous value of AC voltage VI that appears at node N1 is detected by controller 40. Using the above-described abnormality detection method, controller 40 detects an instantaneous voltage drop and an overvoltage of AC power supply 1 based on the instantaneous value of AC voltage VI.

Capacitor C1 and reactor L3 form a low pass filter. Capacitor C1 and reactor L3 allow the AC power of a commercial frequency to flow from AC power supply 1 to converter 50, and prevent a signal of a switching frequency that occurs in converter 50 from propagating to AC power supply 1.

Converter 50 is controlled by controller 40. When AC power supply 1 is normal, converter 50 converts the three-phase AC power into DC power and outputs the DC power to a DC line 55. When AC power supply 1 is abnormal (when an instantaneous voltage drop or an overvoltage occurs), the operation of converter 50 is stopped.

Capacitor C2 is connected to DC line 55 and smooths a voltage of DC line 55. An instantaneous value VDC of the DC voltage that appears on DC line 55 is detected by controller 40. DC line 55 is connected to a higher-voltage-side node of bidirectional chopper 60, and a lower-voltage-side node of bidirectional chopper 60 is connected to battery 30. An instantaneous value of inter-terminal voltage VB of battery 30 is detected by controller 40.

Bidirectional chopper 60 is controlled by controller 40. When AC power supply 1 is normal, bidirectional chopper 60 stores the DC power generated by converter 50 in battery 30. When AC power supply 1 is abnormal, bidirectional chopper 60 supplies the DC power of battery 30 through DC line 55 to inverter 20.

Inverter 20 is controlled by controller 40, and converts the DC power supplied from converter 50 or bidirectional chopper 60 through DC line 55 into three-phase AC power having a commercial frequency and outputs the three-phase AC power. When AC power supply 1 is normal, inverter 20 converts the DC power supplied from converter 50 through DC line 55 into three-phase AC power. When AC power supply 1 is abnormal, inverter 20 converts the DC power supplied from battery 30 through bidirectional chopper 60 into three-phase AC power.

An output node of inverter 20 is connected to one terminal of reactor L4, and the other terminal of reactor L4 is connected to AC output terminal T2 through switch S2. Capacitor C3 is connected to a node N2 between reactor L4 and switch S2. Reactor L4 and capacitor C3 form a low pass filter. Reactor L4 and capacitor C3 allow the AC power of a commercial frequency generated in inverter 20 to flow to AC output terminal T2, and prevent a signal of a switching frequency that occurs in inverter 20 from propagating to AC output terminal T2.

Switch S2 is controlled by controller 40. In "inverter power feeding mode" in which the AC power generated by inverter 20 is supplied to load 2, switch S2 is turned on. In "bypass power feeding mode" in which the AC power is supplied from AC power supply 1 through switch 10 to load 2, switch S2 is turned off.

Switch 10 has the same configuration as that of switch 10 in power supply device 5 shown in FIG. 1. Switch 10 is controlled by controller 40. Switch 10 is turned on in the bypass power feeding mode, and is turned off in the inverter power feeding mode.

Controller 40 controls on and off of switch 10 and power conversion in converter 50 and inverter 20 such that uninterruptible power supply device 6 selectively executes the inverter power feeding mode and the bypass power feeding mode.

Specifically, during the bypass power feeding mode, controller 40 detects an instantaneous voltage drop and an overvoltage of AC power supply 1 based on the instantaneous value of AC voltage VI, using the above-described abnormality detection method. When an abnormality of AC power supply 1 is detected, controller 40 switches uninterruptible power supply device 6 from the bypass power feeding mode to the inverter power feeding mode. Specifically, controller 40 turns off switch 10, and converts the DC power of battery 30 into AC power by inverter 20 and supplies the AC power to load 2. Therefore, even when an abnormality of AC power supply 1 occurs, the operation of load 2 can be continued during a time period in which the DC power is stored in battery 30.

In uninterruptible power supply device 6 shown in FIG. 8 as well, during the bypass power feeding mode, an abnormality of the AC power supply can be detected at the earlier timing immediately after voltage fluctuation. Thus, uninterruptible power supply device 6 can be switched to the inverter power feeding mode quickly after the occurrence of voltage fluctuation, and thus, fluctuation of the AC voltage supplied to the load can be suppressed.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 AC power supply; 2 load; 5 power supply device; 6 uninterruptible power supply device; 10, S1, S2 switch; 11, 12 thyristor; 20 inverter; 30 battery; 40 controller; 42 instantaneous value detection unit; 44 peak value computation unit; 46, 48 threshold value estimation unit; 49 storage unit; 50 converter; 52 abnormality detection unit; 54 switch control unit; 55 DC line; 56 inverter control unit; 60 bidirectional chopper; C1 to C3 capacitor; L3, L4 reactor.

The invention claimed is:

1. A power supply device comprising:
a switch connected between an AC power supply and a load; and
a controller that controls on and off of the switch, wherein the controller includes:
an abnormality detection unit that detects an abnormality of the AC power supply by detecting an instantaneous value of a three-phase AC voltage supplied from the AC power supply, when the switch is on; and a switch control unit that turns off the switch when the abnormality of the AC power supply is detected, the abnormality detection unit based on an instantaneous value of the three-phase AC voltage detected at a first time and a first threshold value preset for a peak value of the three-phase AC voltage, estimates a second threshold value for an instantaneous value of the three-phase AC voltage at a second time, the second time having a prescribed time difference from the first time, and detects the abnormality of the AC power supply by comparing the estimated second threshold value with the instantaneous value of the three-phase AC voltage detected at the second time.

2. The power supply device according to claim 1, wherein the first threshold value includes a threshold value for a peak value for detecting an overvoltage of the AC power supply, and when the instantaneous value of the three-phase AC voltage detected at the second time is larger than the second threshold value, the abnormality detection unit detects the overvoltage of the AC power supply.

3. The power supply device according to claim 1, wherein the first threshold value includes a threshold value for a peak value for detecting an instantaneous voltage drop of the AC power supply, and when the instantaneous value of the three-phase AC voltage detected at the second time is smaller than the second threshold value, the abnormality detection unit detects the instantaneous voltage drop of the AC power supply.

4. The power supply device according to claim 1, wherein the abnormality detection unit calculates a phase of a third-phase voltage at the first time, based on instantaneous values of first-phase and second-phase voltages detected at the first time and a peak value of the three-phase AC voltage at the first time, calculates a phase of the third-phase voltage at the second time, based on the phase of the third-phase voltage at the first time, and estimates the second threshold value, based on the phase of the third-phase voltage at the second time and the first threshold value.

5. The power supply device according to claim 1, wherein the switch includes first and second thyristors connected in antiparallel.

6. The power supply device according to claim 1, wherein the prescribed time difference is set to be longer than a ⅙ cycle of the three-phase AC voltage supplied from the AC power supply.

7. The power supply device according to claim 1, further comprising an inverter that converts DC power of a power storage device into AC power and supplies the AC power to the load, wherein the controller further includes an inverter control unit that starts up the inverter when the abnormality of the AC power supply is detected.

8. An abnormality detection method for an AC power supply, the abnormality detection method comprising:

detecting an instantaneous value of a three-phase AC voltage supplied from the AC power supply;

based on an instantaneous value of the three-phase AC voltage detected at a first time by the detecting and a first threshold value preset for a peak value of the three-phase AC voltage, estimating a second threshold value for an instantaneous value of the three-phase AC voltage at a second time, the second time having a prescribed time difference from the first time; and detecting an abnormality of the AC power supply by comparing the second threshold value estimated by the estimating with the instantaneous value of the three-phase AC voltage detected at the second time.

* * * * *